United States Patent [19]

Reinhardt et al.

[11] Patent Number: 5,014,231
[45] Date of Patent: May 7, 1991

[54] RANDOMIZED DIGITAL/ANALOG CONVERTER DIRECT DIGITAL SYNTHESIZER

[75] Inventors: Victor S. Reinhardt, Rancho Palos Verdes; Kim V. Gould, Hermosa Beach; Kevin M. McNab, Redondo Beach, all of Calif.

[73] Assignee: Hughes Aircraft Company, Los Angeles, Calif.

[21] Appl. No.: 380,786

[22] Filed: Jul. 17, 1989

Related U.S. Application Data

[63] Continuation of Ser. No. 124,539, Nov. 23, 1987, abandoned.

[51] Int. Cl.$^5$ .............................................. G06F 1/02
[52] U.S. Cl. .................................. 364/718; 364/721; 328/14
[58] Field of Search ............... 364/721, 720, 718, 717, 364/603, 607, 608; 328/14; 307/261, 262, 268, 271; 331/40

[56] References Cited

U.S. PATENT DOCUMENTS

| | | | |
|---|---|---|---|
| 4,134,072 | 1/1979 | Bolger | 364/721 X |
| 4,365,201 | 12/1982 | Scott et al. | 328/14 |
| 4,410,954 | 10/1983 | Wheatley, III | 328/14 X |
| 4,482,974 | 11/1984 | Kovalick | 364/721 X |
| 4,536,718 | 8/1985 | Underhill | 331/16 |
| 4,599,579 | 7/1986 | McCann | 331/1 R |

FOREIGN PATENT DOCUMENTS

2121627 12/1983 United Kingdom ................ 364/607

Primary Examiner—Benny T. Lee
Attorney, Agent, or Firm—Steven M. Mitchell; Robert A. Westerlund; Wanda K. Denson-Low

[57] ABSTRACT

A sine output or phase interpolation direct digital synthesizer for use in satellite programs having a random or pseudorandom code generator for summing a random digital word whose value ranges from zero to just under the least significant bit of a digital-to-analog converter with the current register value normally sent to the converter for reducing the spurious sidebands associated with the finite resolution of the converter within the synthesizer, the sum being truncated to the resolution of the converter and for controlling the converter, the spurious sidebands being reduced by randomization of the periodic behavior associated with the truncation process while lowering the total phase noise.

42 Claims, 9 Drawing Sheets

RANDOMIZED DIGITAL/ANALOG CONVERTER DIRECT DIGITAL SYNTHESIZER

This is a continuation of U.S. Ser. No. 07/124,539 filed Nov. 23, 1987, now abandoned.

BACKGROUND OF THE INVENTION

The invention relates generally to direct digital synthesizers and more particularly to a direct digital synthesizer that interjects a randomized digital signal for destroying the coherence of undesirable jitter while minimizing the broad band noise.

Frequency synthesizers are one of the principal building blocks of precise time and frequency systems. Direct digital synthesizers, which synthesize waveforms using digital techniques, have become increasingly important since the advent of large-scale integration. Complex direct digital synthesizers, because of their inherently digital design, can be constructed with exceedingly small size, weight, and power consumption, using digital monolithic fabrication techniques. Other advantages of direct digital synthesizers include high frequency resolution which is easily expandable, wide frequency range, inherently fast settling times, and high spectral purity for certain digital synthesizer architectures.

Various types of direct digital synthesizers which comprise uniform clock direct digital synthesizer design, fall into a plurality of categories which include pulse output and fractional divider direct digital synthesizers, sine output and interpolation direct digital synthesizers, and random jitter injection synthesizers.

The pulse output and fractional divider direct digital synthesizers are devices which have very high spurious side band or spur levels (greater than $-30$ decibels) while the sine output and interpolation direct digital synthesizers are devices which require high resolution digital-to-analog converters to achieve low spur levels (an M-bit digital-to-analog converter produces spur levels on the order of $2^{-2M}$). The term "spurious sideband" or "spur" refers to unwanted peaks or spectral lines produced by periodic modulation harmonics as is discussed in U.S. Pat. No. 4,410,954. The jitter injection synthesizer is a random technique which reduces spurs in the pulse output and the fractional divider type synthesizers by employing a random number generator whose properties must change with the output frequency of the direct digital synthesizer. This necessarily requires the hardware implementation of the random jitter injection synthesizer to be very complex and to produce a very high level random phase noise.

The pulse output direct digital synthesizer is the simplest of the above recited categories of synthesizers. It consists of an N-bit accumulator arranged to add the frequency word (K) to the accumulator value once every clock period ($T_c$). Thus, if the register value is (R), once every clock period the accumulator performs the following operation:

$$R + K \rightarrow R \quad (1)$$

in Modulo $2^N$ arithmetic. Note that for this addition process, the accumulator will overflow, on the average, once every $(2^N)/K$ clock periods, so the average frequency of overflows will be:

$$f_o = F f_c \quad (2)$$

where $f_c$, the clock frequency, is the quantity $(1/T_c)$ where the fractional output frequency, F, is given by:

$$F = K/(2^N) \quad (3)$$

The frequency output of this synthesizer is merely the carry output of the accumulator for a pulse output or in the alternative the most significant bit of the accumulator for an approximate square wave output. This type of synthesizer has the simplest architecture but the highest level of spurs and phase jitter.

The N-bit accumulator is a combination of an N-bit adder plus an N-bit storage register wherein a frequency word K is added to the old register value $R_{N-1}$ to produce the new register value $R_N$ such that each clock period the register is incremented by a value of N. A frequency synthesizer has the property of producing an output pulse every clock period. An ideal sine wave is described by the equation:

$$V = A \sin \phi = A \sin(\omega_0 t) \quad (4)$$

where
V equals voltage;
A is a constant;
$\phi$ is a phase argument; and
$\omega_0$ is the angular frequency.

A device producing this output would be a perfect synthesizer. Therefore, each clock period a frequency word "K" produces a curve on a graph of the phase argument ($\phi$) versus time so that the slope (M) of the curve is equal to:

$$M = \frac{\Delta \phi}{\Delta t} = \omega_0 \quad (5)$$

Therefore, the accumulator discretely mimics the continuous process that is inherent in the equation $\phi = \omega_0 t$.

Because the sine wave of Equation 4 of a perfect synthesizer is difficult to reproduce, a square wave is employed to mimic the sine wave which describes the output of the pulse wave synthesizer. The pulse wave and the sine wave have duplicate zero axis crossing points, however, they differ in harmonics. Each 360-degree square cycle generates a pulse and the frequency information may be in the change of the pulses and not necessarily in the shape of the pulses. Thus the period of the output signal ($T_o$) equals $1/f_o$:

$$T_o = 1/f_o \quad (6)$$

while the angular frequency $\omega_0$ is equal to $2\pi f_o$:

$$\omega_0 = 2\pi f_o \quad (7)$$

The N-bit accumulator is a binary device of N-bits long with a register for storing binary information of N-bits in length plus an N-bit adder. Every clock cycle, the accumulator receives the frequency word of value "K" and adds that value to the current register value $R_{N-1}$ as described in Equation 8.

$$R_N = K + R_{N-1} \quad (8)$$

Thus, the register value represented by $R_N$ represents the nth clock cycle while the value $R_{N-1}$ is the last value added to the register. At the beginning of a clock cycle, the value of $R_{N-1}$ is equal to zero so that $R_N$ is equal to K. When the register value is incremented with the next value of K, the resulting value of $R_N$ is equal to 2K. Each additional incremental value of K results in the current $R_N$ value being equal to the previous register value plus the new increment K so that where n is the number of clock cycles Equation (8) is approximately equal to (nK) as shown in Equation (9).

$$R_N = nK \qquad (9)$$

Where the maximum size of the Nth register value is equal to (nK) and that value is greater than the maximum number of storage locations in the accumulator, then the accumulator is not capable of storing the current register value. The maximum number of storage locations in the accumulator is determined by the quantity $(2^N - 1)$. Thus for a six-bit accumulator, there are $(2^6 - 1)$ or sixty-three binary storage positions in the accumulator. The number sixty-three in binary is designated by six ones. Therefore, if the present or current register value $R_N$ is larger than six binary ones, then the accumulator must eliminate the seventh digit which is the most significant bit of the stored number. This is accomplished by Modulo arithmetic which subtracts out a multiple of the stored binary number, as is illustrated in Equation (10).

$$R_N = Mod 2^N (nK) = \frac{nK}{2^N} \qquad (10)$$

Another example would be a storage device capable of storing only three digits and when the number stored (nK) reaches the number one thousand (1000), then any number that exceeds one thousand would be divided by the multiple of the stored number which would be 1000. The number 1000 would be removed from the storage element and the difference between the stored number and the multiple would be the remainder number left within the storage element. For example, if the stored number was 1002 and the multiple was 1000, then the division and difference would result in a stored number of 002. The truncated or discarded digit would be the "1" in the number 1000 and this truncated or discarded digit is the carry digit.

In the pulse-type synthesizer, the carry is the synthesizer output which is also referred to as the overflow. The overflow occurs when the value (nK) is approximately equal to the maximum number of digits stored within the storage element $(2^N)$ which is also equal to the average number of clock cycles between overflows. The number of clock cycles between overflows can be determined by the Equation:

$$n = 2^N/K \qquad (11)$$

Therefore, the average time $(T_o)$ between carry-overs is equal to $nT_c$ which equals $(2^N/K) T_c$ since (n) is equal to $2^N/K$.

$$\Delta T_o = nT_c = (2^N/K) T_c \qquad (12)$$

Since the output frequency is equal to the reciprocal of the average time between carry-overs, then by substituting the average time between carry-overs for $T_o$, the output frequency $(f_o)$ generated by the synthesizer is equal to the fractional frequency (F) times the clock frequency $(f_c)$ as is illustrated in Equation (2). This relationship is fundamental to all direct digital synthesizers.

A problem with the pulse output direct digital synthesizer is that the relation described in Equation (11) is in general not always true. Therefore the value (nK) is not always equal to $2^N$ which results in the creation of jitter. Jitter is described as variations in the output waveform from the average time between overflows. If the output waveform is compared to the ideal waveform along a time axis, a dissymmetry or time difference becomes evident, with the time difference being equal to the jitter ($\Delta t_o$ = time difference = jitter).

The jitter or dissymmetry between the output waveform of the actual synthesizer and the output waveform of an ideal synthesizer occurs in a coherent fashion which produces sideband spurs. The sideband spurs can occur in the immediate proximity of the intellegence or carrier frequency information that is being transmitted or received in the precise time and frequency systems. The spurs are undesirable flaws in the output waveforms of the direct digital synthesizer. If the jitter is plotted with respect to time, the jitter illustrates a periodic behavior repeating itself after some multiple of the output signal period $(T_o)$.

Harmonics are multiples of the output frequency. However, the spurious sidebands are not multiples of the carrier wave $(f_o)$ and can occur close to the carrier frequency. Thus, the sidebands interfere with identifying the carrier synthesized frequency output $(f_o)$ which is the problem. It can be shown that the frequency difference between the output of the synthesizer $(f_o)$ and the frequency of a sideband spur $(f_s)$ is greater than or equal to the clock frequency $(f_c)$ divided by $2^N$ which is equal to the frequency resolution as is shown in Equation (13).

$$\Delta f = (f_o - f_s) \geq \frac{f_c}{2^N} \qquad (13)$$

The fractional divider direct digital synthesizer is a variation on the pulse output direct digital synthesizer. In this type of synthesizer, the accumulator carry output is used to drive the (n/(n+1)) control line of a divide-by-(n/(n+1)) counter so that the (n+1) division occurs on a carry. The accumulator is clocked by the output of the divider, $f_o$, so the carry sets the (n+1) divide for the next output of the divider after the carry occurs. The divider is clocked by the clock frequency input $(f_c)$ and the output of the synthesizer is $(f_o)$. On the average, the output frequency is:

$$f_o = f_c/(n+F) \qquad (17)$$

where (F) equals $K/2^N$. Note that in this case (F) determines the fractional part of the division. In the fractional divider direct digital synthesizer, the excessive spurs and phase jitter are similar to those of the pulse output direct digital synthesizer.

The sine output direct digital synthesizer produces a smoother more sine like signal by adding a sine look-up table and a digital-to-analog converter to the pulse type direct digital synthesizer. The sine look-up table computes the value of the equation represented by:

$$S = \operatorname{Sin} [2\pi (R/2^N)] \qquad (14)$$

The value (S) is computed to the resolution of the sine table and the digital-to-analog converter converts the sine value into an analog voltage. The output of the sine table is then sent to the digital-to-analog converter which provides an output voltage proportional to the sine table value to the M-bit resolution of the digital-to-analog converter. The result of this process produces a stepped sine wave output given by the Equation:

$$V = A \sin(2\pi F f_c t); \ t = nT_c. \tag{15}$$

This stepped sine output produces lower spurs than the pulse output direct digital synthesizer.

The synthesized output is a stepped sine wave. To a large extent, the circuit complexity of the sine output direct digital synthesizer results from the sine table. Generating the sine table to full resolution directly from a read only memory (ROM) usually requires a prohibitively large ROM so techniques have been developed to reduce the ROM requirements by computing the sine wave for several lower resolution tables.

In computing spur power, the following equation is applicable:

$$\text{Spurs} = \frac{\text{Spur Power } (S_o)}{\text{Carrier Power } (C_o)} \leq 2^{-N}. \tag{16}$$

The determination of spur power depends upon the accuracy of the calculations so that the relative accuracy is equal to $2^{-2N}$.

The worst non-principal, non-harmonic spur may be calculated in decibels by multiplying ten times the logarithm (base 10) of the relative spur power which results in the value ($-6N$). The pulse type direct digital synthesizer has one of the simplest architectures but the problem exists in that this synthesizer has the highest level of spurs and phase jitter. In order to reduce the spurs in the sine output synthesizer, the value (N) must be made larger which increases the complexity and reduces the speed of the circuit. By increasing the number of bits in the sine look-up table and the digital-to-analog converter, the size of the sine look-up table may be calculated by the product $(N \times 2^N)$ which grows at a rapid pace.

The phase interpolation direct digital synthesizer is similar to the sine output direct digital synthesizer in that it produces lower spurs, but it does not require a sine look-up table. The phase interpolation process utilizes the fact that whenever a carry occurs in the accumulator of a pulse output direct digital synthesizer or a fractional divider synthesizer, the accumulator register value (R) is proportional to the phase deviation between the actual output of the fractional divider and an ideal output at frequency $f_o$. Thus, if the phase of the output of the pulse output direct digital synthesizer or the fractional divider direct digital synthesizer is shifted by $[2\pi (R/2^N)]$, a smoother output would result.

Both the pulse output and fractional divider direct digital synthesizer have the problem of producing outputs whose frequency spectrums contain relatively high level spurious spectral sidebands along with the carrier when the fractional frequency (F) is not an inverse power of two. These spurs occur for two reasons. First, when the fractional frequency is not an inverse power of two, both types of synthesizers produce a digital output whose transitions deviate in time (transition jitter) from that of an ideal frequency generator at $f_o$. When the fractional frequency is not an inverse power of two, the output $f_o$ of an ideal frequency generator would provide a signal whose transitions would not occur at integral multiples of the clock frequency. However, both types of synthesizers must produce transitions which occur at integral multiples of the clock frequency. Secondly, the transition jitter causes coherent sideband spurs (spectral spurs) because the deviations in transition time form a periodic pattern whose period is some multiple of the clock period. This periodic pattern produces a coherent frequency spectrum.

In order to produce spurious sidebands, jitter must be present and that jitter must be coherent. For the same standard deviation and time, two frequency variations exist. Those variations consist of the coherent frequency spectrum versus the non-coherent frequency spectrum. In the coherent frequency spectrum, the spectrum is comprised of spurious sidebands which may include a large spike located in the immediate vicinity of the carrier frequency.

If a narrow band filter is employed in the non-coherent frequency system, the system noise is reduced to a uniform controlled level so that the carrier frequency is easily distinguished. However, in the coherent frequency spectrum, the narrow band filter does not reduce the spurious sidebands which are close to the carrier frequency so that the carrier frequency may not be easily distinguished.

A jitter injection technique for use on a pulse output direct digital synthesizer for reducing the size of spectral spurs in the output is known. This technique is designed to reduce the spurious sidebands by completely destroying the periodicity of the deviation pattern of the transitions by randomly adding digital jitter to the addition process in the accumulator. It is claimed that the coherence of the jitter process is destroyed and redistributed as spectral noise. The problems that occur with this solution is that the coherence of the jitter is not completely destroyed and that a high degree of phase noise is produced. By injecting the random digital jitter, the total system jitter is increased which raises the level of the phase noise in the system. Various random jitter techniques for use in direct digital synthesizers have been known for a number of years, and by way of example, at least one form of such a technique can be found in U.S. Pat. No. 4,410,954.

Hence, those concerned with the development and use of direct digital synthesizers in the precise time and frequency system field have long recognized the need for improved direct digital synthesizers which reduce the spurious sidebands by completely destroying the coherence and periodicity of the deviation pattern of the transitions without producing a high degree of phase noise.

SUMMARY OF THE PRESENT INVENTION

Briefly, and in general terms, the present invention provides a new and improved direct digital synthesizer construction which substantially reduces the coherence of the spurious sidebands associated with the finite resolution of the digital-to-analog converter permitting rapid identification of the carrier frequency ($f_o$), and which significantly decreases the phase noise by a factor of ($2^{-M}$) lower than previous techniques. Moreover, the synthesizer construction of the present invention does not inordinately increase circuit complexity, employs a random binary word with fixed properties, is small in size, weight, and power consumption and is simple to implement.

Basically, the present invention is directed to an improved electronic method and apparatus for reducing the spurious sidebands associated with the finite resolution of the digital-to-analog converter without overly increasing the initial phase noise level or without inordinately increasing circuit complexity. This is accomplished by employing a random or pseudorandom noise generator with a sine output direct digital synthesizer or a phase interpolation direct digital synthesizer for reducing the spurious sidebands associated with the finite resolution of the digital-to-analog converter employed in the direct digital synthesizers.

The technique sums the digital value normally sent to the digital-to-analog converter with a random or pseudorandom noise word whose value goes from zero to just under the least significant bit of the digital-to-analog converter. This sum is then truncated to the resolution of and is used to control the digital-to-analog converter. The random or pseudorandom noise word reduces the spurious sidebands because it randomizes the periodic behavior associated with the truncated process, thereby destroying the coherence of the phase jitter which is necessary to produce the spurious sidebands.

In accordance with the invention, a sine table read only memory (ROM) with N-bit resolution is driven by an accumulator as in a conventional sine output direct digital synthesizer. The output of the sine table ROM is then summed with the random or pseudorandom word integer in an N-bit adder. The addition of the random or pseudorandom noise word to the sine table value reduces the output spurs because the coherence of the difference between the synthesizer actual output and the output of an ideal sine generator (jitter) is destroyed, producing only broad-band noise.

It has been discovered that the coherence of the output fluctuations or jitter is reduced if a random process is introduced which causes the mean value of the output fluctuations to equal zero. If the mean value of the fluctuations is zero, then the mean value of the fourier transform of the fluctuations will be zero and the spurs disappear. The process of adding the random or pseudorandom noise word to the sine table value in the randomized digital-to-analog converter direct digital synthesizer is to make the mean value of the output fluctuations (jitter) equal to zero.

In this regard, it has been determined that the introduction of the random or pseudorandom noise word to the sine table value reduces the phase noise level by a factor of $(2^{-M})$ lower than prior jitter injection techniques.

It is recognized that wide frequency range synthesizers with very low spur and random noise levels are needed in satellite programs. Future satellite programs will require such low spur, low noise synthesizer which can hop in frequency over gigahertz bands with fast settling times. It is important that synthesizers have low size, weight, and power consumption for multiple synthesizer applications. The instant invention described herein will facilitate the development of such synthesizers employing high speed monolithic fabrication technology utilizing the same circuit complexity required to achieve the same spur levels and random noise levels as in the past.

The new and improved randomized direct digital synthesizer of the present invention reduces the spurious sideband levels while reducing the phase noise level, does not inordinately increase circuit complexity an is simple to implement. The synthesizer is small in size and weight, minimizes power consumption and requires only a single random or pseudorandom noise generator to drive several direct digital synthesizers of the present invention. Further, the randomized direct digital synthesizer is utilized with a sine output or a phase interpolation direct digital synthesizer and further employs a random digital word having fixed properties.

These and other objects and advantages of the invention will become apparent from the following more detailed description, when taken in conjunction with the accompanying drawings, which illustrate, by way of example, the features of the invention.

DETAILED DESCRIPTION OF THE PREFERRED EMBODIMENT

Figure 6:
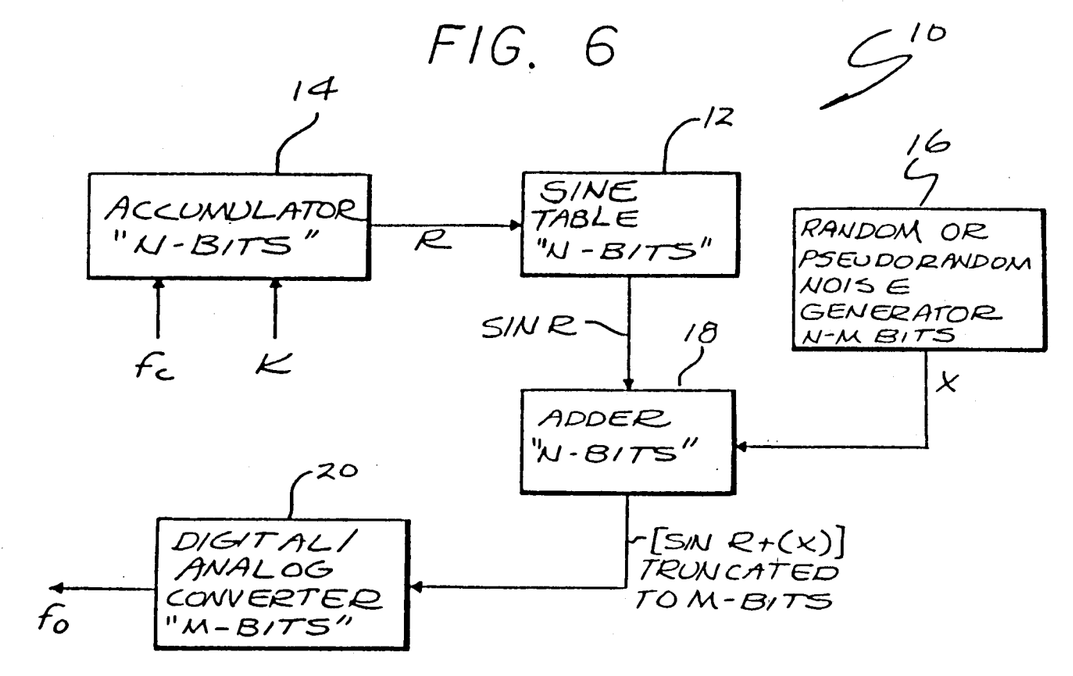
FIG. 6 illustrates a block diagram of a sine output randomized digital-to-analog converter direct digital synthesizer in accordance with the present invention.

As shown in FIG. 6 for purposes of illustration, the invention is embodied in a direct digital synthesizer 10 of the type having a sine look-up table read only memory (ROM) 12 for converting the register value (R) of an accumulator 14 to a sine function sine R and also having a random or pseudorandom noise generator 16 for providing a random word (x) which is added to the quantity sine (R) in an adder 18 and then converted from a digital to an analog signal in a digital-to-analog converter 20, the process reducing the spurious sidebands and the phase noise of the synthesized signal.

Figure 1A:
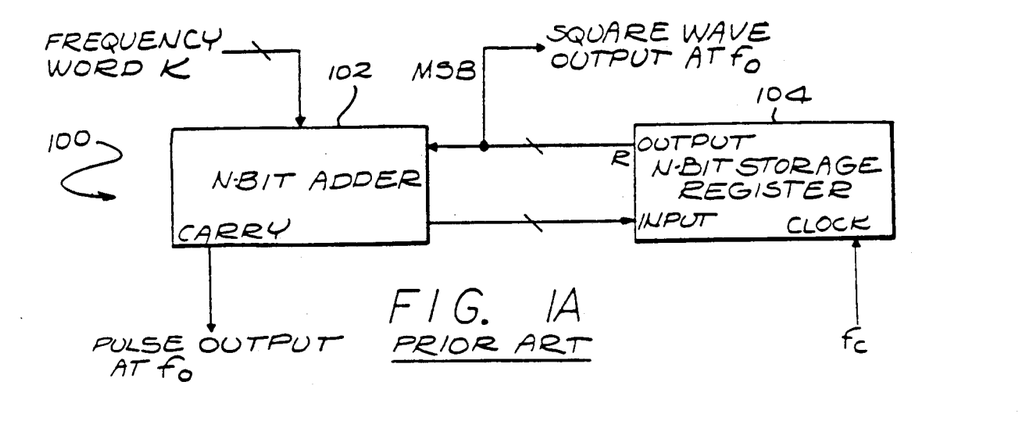
FIG. 1A illustrates a block diagram of a pulse output direct digital synthesizer of the prior art.

The pulse output direct digital synthesizer identified by the general reference character 100 comprises the simplest construction of synthesizers of the past having an N-bit accumulator comprised of an N-bit adder 102 and a N-bit storage register 104, as is illustrated in FIG. 1A. The frequency word (K) is added to the accumulator value once every clock cycle ($T_c$). If the register value is (R), then once every clock cycle the accumulator performs the operation $$R + K \longrightarrow R \qquad (1)$$

in modulo $2^N$ arithmetic.

Figure 1B:
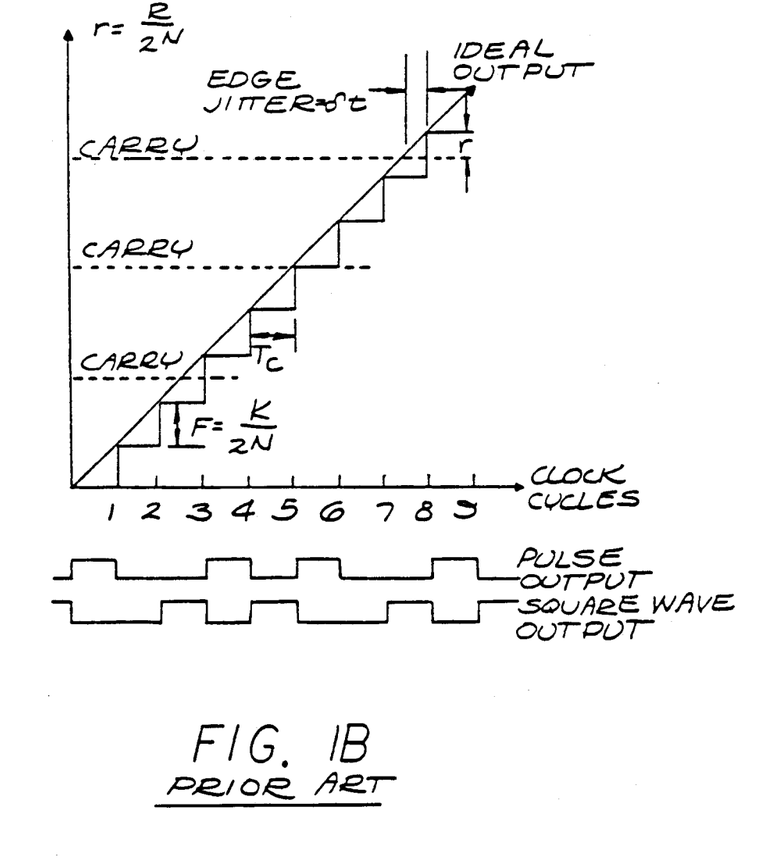
FIG. 1B illustrates a graphical representation of the waveform output of a pulse output direct digital synthesizer of the prior art.

Note that in the pulse output synthesizer, the accumulator will overflow on the average of once every ($2^N/K$) clock periods so that the average frequency of overflows will be $$f_o = Ff_c \qquad (2)$$

where $f_c$ is the clock frequency which is equal to ($1/T_c$) and where the fractional output frequency (F) is given by $K/2^N$. The frequency output of this synthesizer is merely the carry output of the accumulator for a pulse output or the most significant bit (MSB) of the accumulator for an approximate square wave output, as is illustrated in FIG. 1B.

Note that an ideal output for a direct digital synthesizer is shown in the graph of FIG. 1B and which is approximated by the continuous series of frequency words (K). The difference in time or fluctuation between the ideal waveform and the synthesized waveform is identified as the edge jitter which is one of the components that is required for the production of spurious sidebands. The pulse type synthesizer, although being the simplest in architecture, produces the highest level of spurs and phase jitter.

Figure 2A:
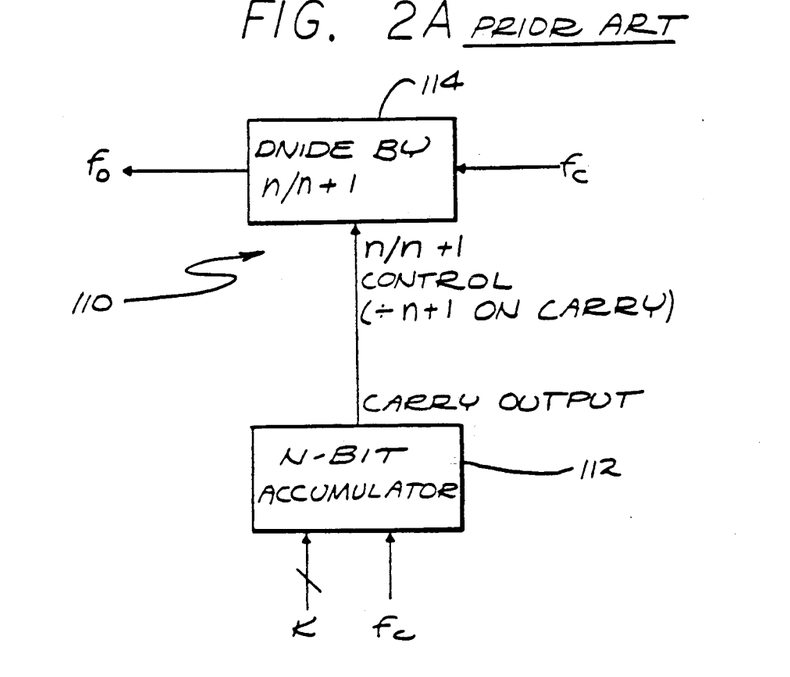
FIG. 2A illustrates a block diagram of a fractional divider direct digital synthesizer of the prior art.
Figure 2B:
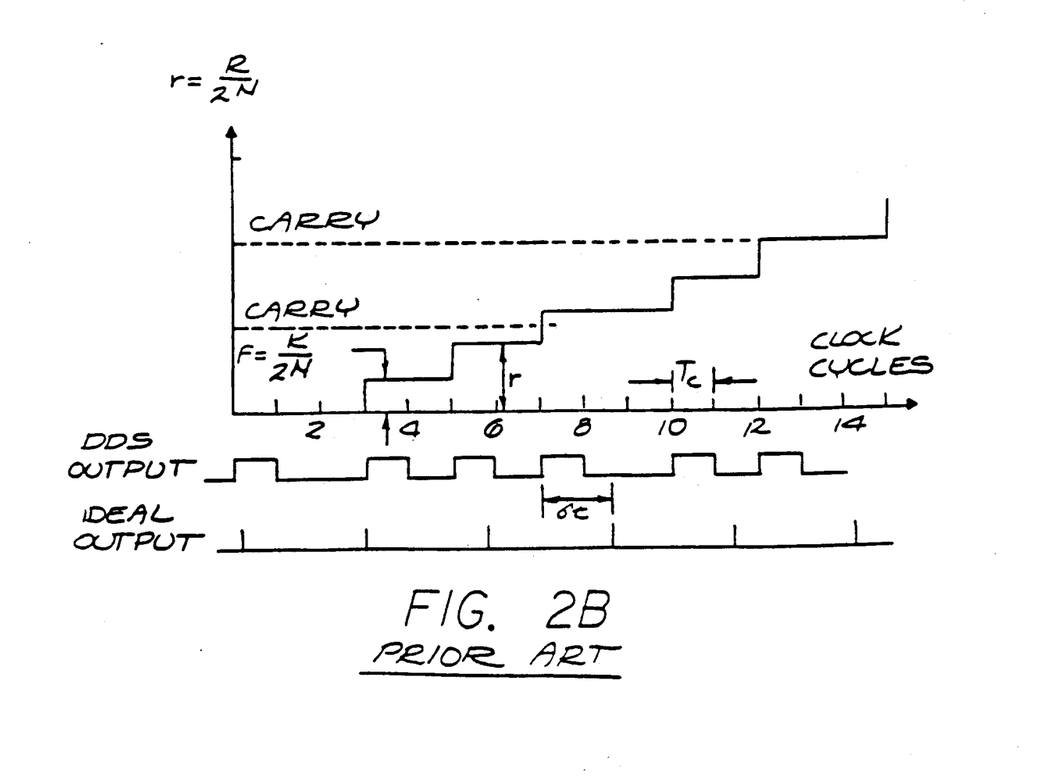
FIG. 2B illustrates a waveform diagram of a fractional divider direct digital synthesizer of the prior art.

The fractional divider direct digital synthesizer identified by the general reference character 110 is comprised of an N-bit accumulator 112 and a divide-by-(n/(n+1)) counter 114. In the fractional divider synthesizer 110, the carry output of the N-bit accumulator 112 is utilized to drive a (n/(n+1)) control line of the counter 114 so that the (n+1) division occurs on a carry, as is illustrated in FIG. 2A. The output frequency ($f_o$) is taken from the output of the counter 114 so that on the average the output frequency is $$f_o = f_c/(n+F) \qquad (17)$$

where (F) is the fractional part of the division. The problems with the spurious sidebands and the phase jitter in the fractional divider synthesizer are similar to those of the pulse output synthesizer. A representation of the synthesized waveforms are shown in contrast to the ideal output waveform in FIG. 2B.

Figure 3A:
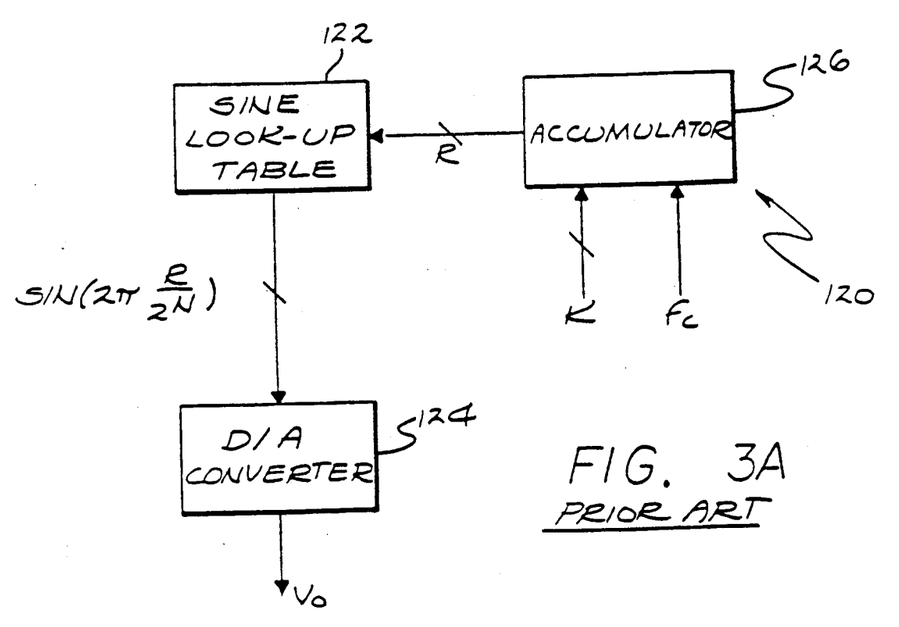
FIG. 3A illustrates a block diagram of a sine output direct digital synthesizer of the prior art.
Figure 3B:
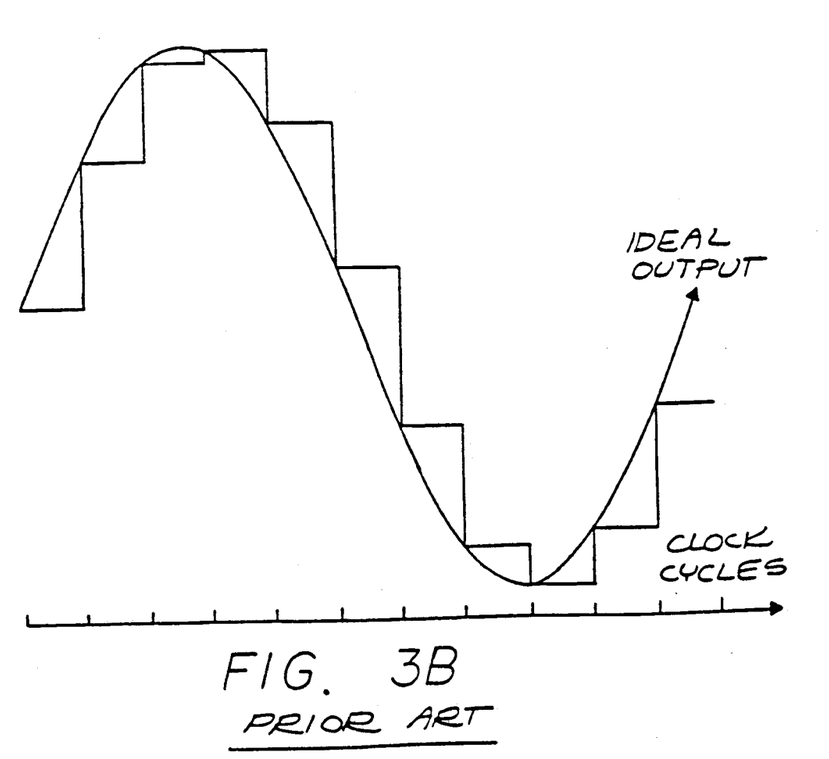
FIG. 3B illustrates an output waveform of a sine output direct digital synthesizer of the prior art.

The sine output direct digital synthesizer identified by the general reference character 120 produces a smoother more sine-like signal by adding a sine look-up table 122 and a digital-to-analog converter 124 to an accumulator 126 of the type employed in the pulse type synthesizer, the sine output synthesizer being illustrated in FIG. 3A. The sine look-up table 122 computes $$S = \operatorname{Sin}\,[2\pi(R/2^N)] \qquad (14)$$

to the resolution of the sine table 112 while the digital-to-analog converter 124 converts the sine value into a voltage. The result of this process is to produce a stepped sine wave output given by $$V = A\,\operatorname{Sin}\,(2\pi F f_c\,t);\ t = nT_c \qquad (15)$$

as is illustrated in the synthesizer output waveform of FIG. 3B. The sine output synthesizer 120 produces a lower level of spurious sidebands and phase jitter but has the highest level of circuit complexity.

The phase interpolation direct digital synthesizer identified by the general reference character 130 is similar to the sine output synthesizer in that it produces lower spurs; however, the phase interpolation synthesizer does not require a sine look-up table. The phase interpolation process utilizes the fact that whenever a carry occurs in the accumulator of a pulse output synthesizer or a fractional divider synthesizer, the accumulator register value (R) is proportional to the phase deviation between the actual output of the fractional divider synthesizer and an ideal output at frequency ($f_o$). Thus, if the phase of the output of the pulse output synthesizer or fractional divider synthesizer was shifted by [$2\pi(R/2^N)$], a smoother output would result.

Figure 4A:
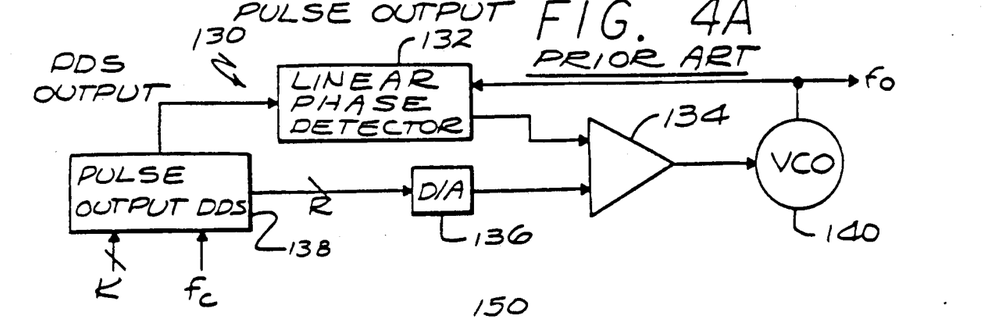
FIG. 4A illustrates a first block diagram of a phase interpolation direct digital synthesizer of the prior art.

In the first embodiment of the phase interpolation synthesizer 130, a phase lock loop using a linear phase detector 132, a differential loop amplifier 134, and a digital-to-analog converter 136 which is driven by the register output (R) from a pulse output direct digital synthesizer 138 are collectively used as a linear phase shifter. The differential loop amplifier 134 feeds an output signal to a voltage controlled oscillator 140 which provides an output frequency ($f_o$) which completes the phase lock loop.

Figure 4B:
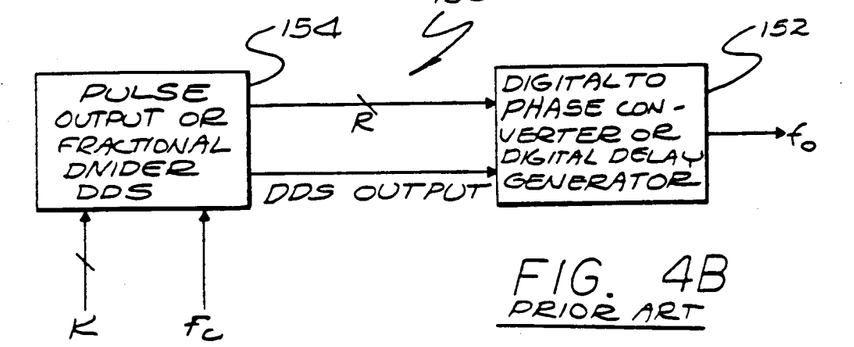
FIG. 4B illustrates a second block diagram of a phase interpolation direct digital synthesizer of the prior art.

In a second embodiment of the phase interpolation synthesizer identified by the general reference character 150, a digitally controlled phase shifter (digital-to-phase converter) or a digitally controlled delay line (digital delay generator) 152 is used directly on the pulse output synthesizer or a fractional divider synthesizer 154. The pulse output or fractional divider synthesizer 154 receives the incremental frequency word (K) and the periodic clock frequency ($f_c$) and transmits the register value (R) and the synthesizer output to the converter or delay generator 152 which provides a frequency output ($f_o$).

Figure 4C:
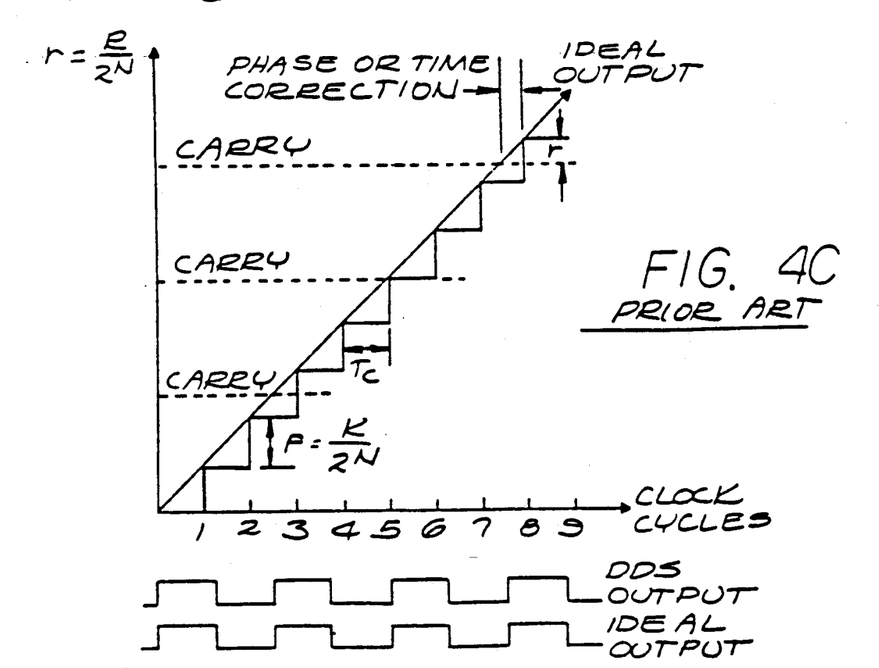
FIG. 4C illustrates an output waveform of a phase interpolation direct digital synthesizer of the prior art.

Each of the embodiments of the phase interpolation synthesizer are limited in performance by the linearity and the accuracy of the digital-to-phase conversion process. The synthesized output signal is graphically represented adjacent to the ideal output waveform in FIG. 4C along with the phase or time correction (jitter) and the incremental carries. Also shown is the synthesizer and ideal output waveforms.

Figure 5A:
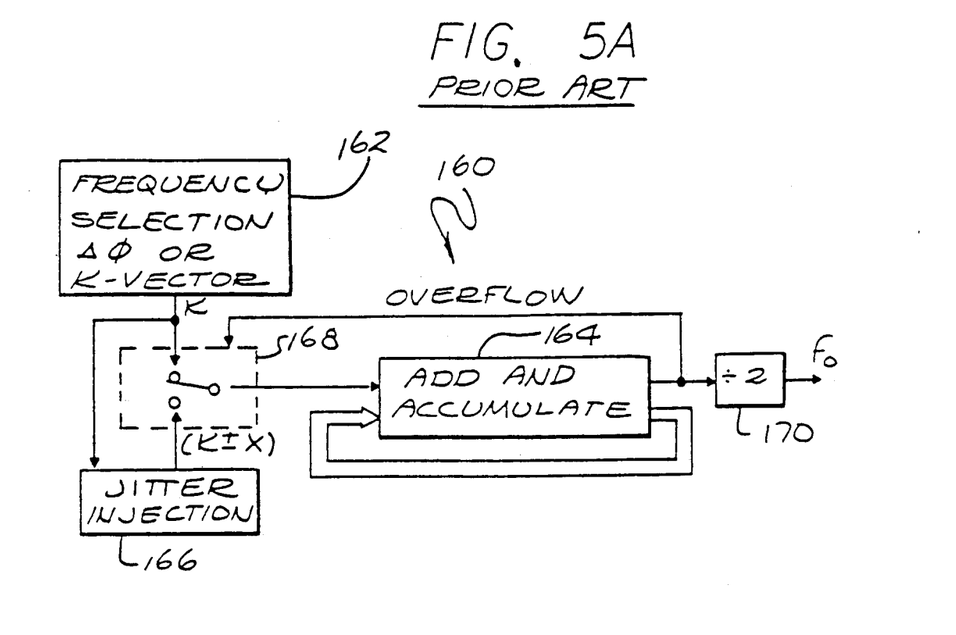
FIG. 5A illustrates a first block diagram of a random jitter injection direct digital synthesizer of the prior art.

The random jitter injection technique identified by the general reference character 160 was developed for use on a pulse output direct digital synthesizer for reducing the size of the spectral spurious sidebands in the output signal. The technique was designed to reduce the spectral spurs by completely destroying the periodicity of the deviation pattern of the transitions. In a first embodiment, the elements comprising the random jitter injection 160 include a frequency selector 162, an add and accumulate register device 164, a jitter injection 166, a switching device 168, and a divider circuit 170. For two clock cycles after an overflow of the accumulator register 164, the frequency word (K) is replaced successively by the random values $(K+x_i)$ and $(K-x_{i-1})$ where the absolute value of $x_i$ represents the sequence of equally distributed random values from zero to $K-1$.

It was claimed that this replacement of the frequency word (K) would completely destroy the coherence of the deviation pattern and that the spectral spurs would be replaced by a noise spectrum whose spectral density was approximately $[(\pi^2 f_o)/(3f_c^2)]$ at frequencies small compared to $(f_c)$.

Figure 5B:
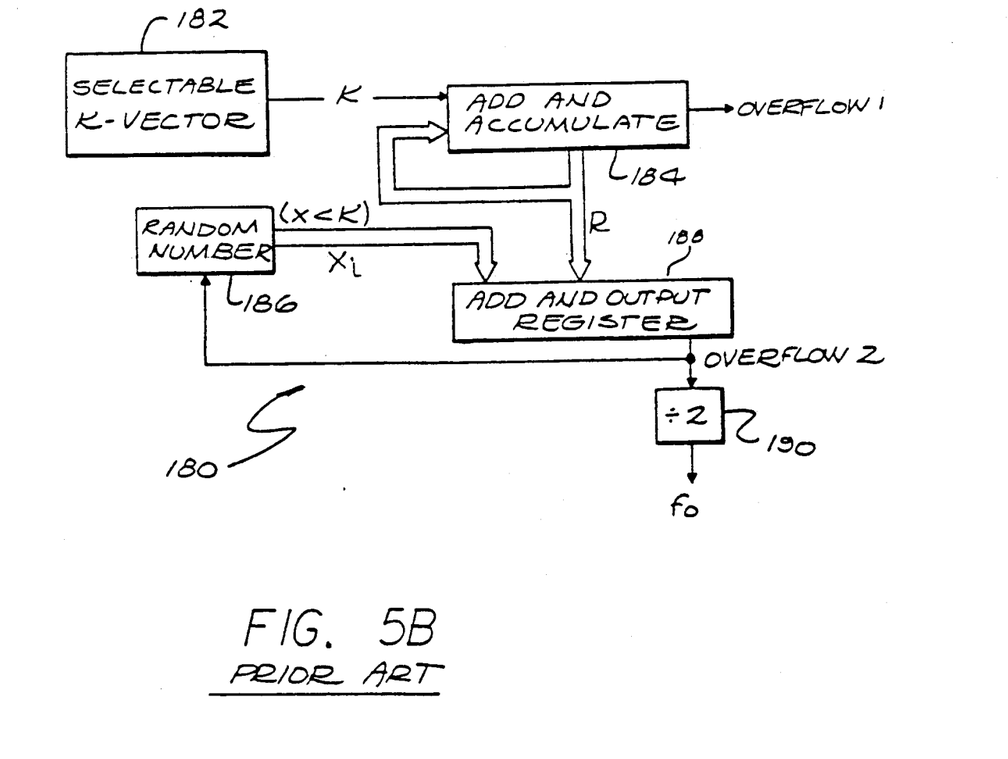
FIG. 5B illustrates a second block diagram of a random jitter injection direct digital synthesizer of the prior art.

A second embodiment of the random jitter injection technique identified by the general reference character 180, includes a selectable K-vector 182, an add and accumulate register 184, a random number injector 186, a add and output register 188, and a divider circuit 190. In the second embodiment of the random jitter injection technique 180, the same result that was reached in the first embodiment 160 may be obtained by summing, in the add and output register 188 (second accumulator), the register value (R) contained in the accumulator of a conventional pulse output synthesizer (add and accumulate register 184) with a random number $x^i$. Again, the absolute value of $x_i$ represents the sequence of equally distributed random values from zero to $K-1$. Note that the add and output register 188 performs the operation $(R+x_i, \text{modulo } 2^v)$. The frequency output is the carry output (designated as overflow number 2 on FIG. 5B) of the add and output register 188.

Figure 5C:
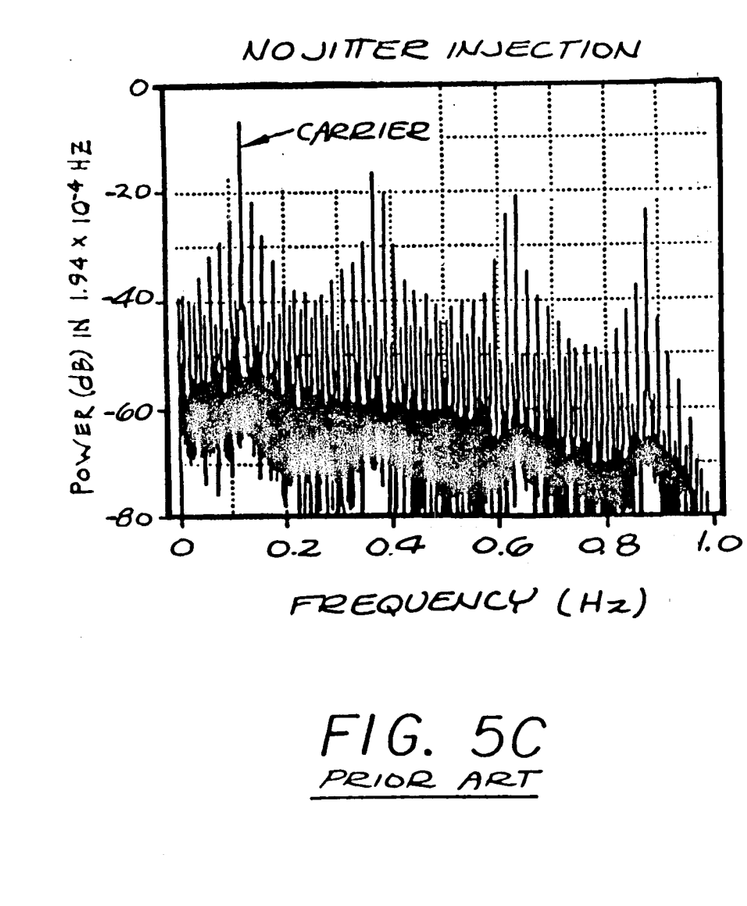
FIG. 5C illustrates a graphical representation of the output frequency signal of a direct digital synthesizer of the prior art.
Figure 5D:
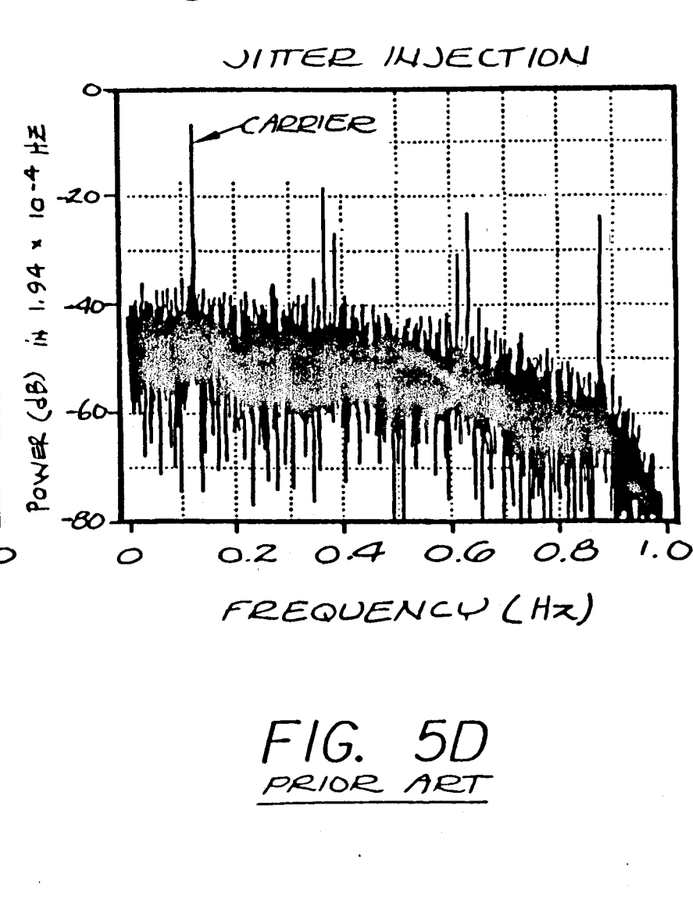
FIG. 5D illustrates a graphical representation of the output frequency signal of a random jitter injection system of the prior art.

The divider circuit 170 in the first random jitter embodiment 160 and the divider circuit 190 in the second random jitter embodiment 180 divide the output signal by two after the carry over signal for producing a square wave rather than a pulse output. The divider circuits are an unessential part of either embodiment. Graphical representations of power in decibels versus frequency (in hertz) are illustrated in FIGS. 5C and 5D. The spectral spurs are shown surrounding the carrier frequency in FIG. 5C which illustrates the case where the random jitter injection technique is not employed. Conversely, when the random jitter injection technique of the prior art is employed, the spurious sidebands are substantially reduced such that the carrier frequency is more easily distinguishable, as is shown in FIG. 5D.

However, the random jitter injection technique of the past does not completely eliminate the spurious sidebands and does not reduce the total amount of the transition jitter which leads to an increase in the phase noise. The increase in phase noise is indicated by the sloping posture of the waveform pattern in FIG. 5D.

In accordance with the present invention, the accumulator 14 and the sine table 12 of the direct digital synthesizer 10 cooperate with the adder 18 to sum the mathematical sine of the register value (R) with a random digital value (x) supplied by the random or pseudorandom noise generator 16 for reducing the spacial spurious sidebands in the output of the digital-to-analog converter 20 and to significantly reduce the resultant phase noise produced in jitter injection circuits of the past. Further, the synthesizer does not inordinately increase circuit complexity, is simple to implement, has a small size and weight, and minimizes power consumption with only one random or pseudorandom noise generator required to drive several synthesizers, each employing a random digital word with fixed properties.

In the sine output randomized synthesizer 10, the accumulator 14 functions to step the sine table 12 at a uniform rate for generating the angle $\phi$ where $\phi = \omega_o t$. The sine look-up table generates the sine of $\phi_n$ in digital form for approximating the synthesized wave. The ROM in the sine look-up table may, in the alternative, be a random access memory. The random accumulator is comprised of the adder 18 and the random or pseudorandom noise generator 16, where the adder sums the sine value of (R) and the noise word (x) resulting in $[\text{Sin}(R) + (x)]$ and the noise generator provides the random digital value (x). Finally, the M-bit digital-to-analog converter 20 translates the sum of the (R) and (x) into a voltage output signal.

The accumulator 14 comprises an N-bit adder plus an N-bit storage register which is incrementally controlled and timed by the clock frequency and is fed the periodic word (K) which is added to the old register value (R) to produce the new register value (R) as was described in Equation (1). The output of the accumulator 14 is the new register value (R) which is fed to the sine table 12. For each integral clock cycle $(T_c)$, the accumulator is fed the incremental value of (K) so that the accumulator discretely mimics the continuous process that is inherent in the relation $\phi = \omega_o t$. The resulting output waveform is a synthesized stepped sine wave similar to the waveform disclosed in FIG. 3B for the sine output synthesizer.

The sine table ROM 12 receives the new register value (R) and provides an output signal which is the (Sin R). The value of (Sin R) is fed to the N-bit adder 18. The random or pseudorandom noise generator 16 is actually a second accumulator which injects the jitter signal (x) into the adder 18. The signal emitted by the adder 18 is the sum of the signals and equals $[\text{Sin}(R) + (x)]$. The added value is then truncated to M-bits prior to being transmitted to the digital-to-analog converter 20.

The noise generator 16 which acts as a random accumulator injects the random noise signal for eliminating the spurious sidebands by destroying the coherency of the jitter through randomization of the phase jitter. The result is that the spurious sidebands are replaced by broad band noise; however, the broad band noise is reduced by a factor of $(2^{-2M})$ compared to previous jitter injection systems.

Note that the random or pseudorandom noise generator 16 which injects the random jitter signal (x) is located in a different position in the sine output synthesizer than in previous systems and design techniques of the past. The result is that the spurious sidebands are drastically reduced and the phase noise is lowered by (60–70) decibels. The need for reducing the size and complexity of the sine table 12 is alleviated by adding the second accumulator. Although the noise generator 16 (second accumulator) injects a random jitter word into the adder 18, the size of the jitter added is reduced by a factor of $(2^{-M})$. Thus each of the two properties required for the production of spurious sidebands are reduced. Although the jitter is numerically increased, the percentage of increased jitter is reduced while destroying the coherence of the jitter which eliminates the periodic behavior.

The largest value of the sine table ROM 12 is when each of the N-bits is a numerical one and this condition is represented by the mathematical equivalent of $(2^N - 1)$. This value is approximately equal to $2^N$ which is the largest value in a decimal equivalent. In binary, the smallest step size is equal to the least significant bit. Since the largest value is equal to $2^N$, then a fractional step is equal to $1/(2^N)$. Therefore, the relative position of the N-bit word is $1/(2^N)$ which is equal to $(2^{-N})$. This leads to a relative spur size equal to $(\frac{1}{2}^N)^2=(2^{-N})^2$.

The digital-to-analog converter 20 is an M-bit device. The output signal of the adder 18 is truncated to M-bits. Based on the foregoing, the relative error in the converter 20 is less than or equal to $(2^{-M})$ as the jitter is added below one least significant bit of the digital-to-analog converter 20.

The problems with the jitter injection technique of the past which was employed with pulse output or fractional divider synthesizers have been that the properties of the injected random word had to change with the output frequency of the synthesizer and that the phase noise was very high. In fact, it can be shown that the variance of the phase fluctuations for the prior techniques were given by $(2\pi f_o T_c)^2/6$. For a value of $f_o T_c = \frac{1}{3}$, the phase noise of a jitter injection synthesizer was about 50 degrees.

However, the randomized digital-to-analog converter direct digital synthesizer of the instant invention is used with sine output or phase interpolation synthesizers, uses a random word with fixed properties and lowers the phase noise by a factor of $(2^{-M})$ when used with a synthesizer with a M-bit digital-to-analog converter.

In the embodiment of the randomized direct digital synthesizer shown in FIG. 6, the sine table ROM 12 with N-bit resolution is driven by the accumulator as in the conventional sine output synthesizer. The output of the sine table ROM is then summed with the random or pseudorandom word which ranges from (0 to $2^{N-M}-1$) with uniform probability where (N) is the number of bits in the accumulator and (M) is the bit resolution of the converter 20. That is, the random or pseudorandom word ranges from zero to the least significant bit of the converter minus one. The sum of the sine output ROM and the random word is then truncated to M-bits with the lower bits being discarded. The (M) bits are used to drive the converter which has been trimmed to an accuracy of N-bits.

It is the addition of the random or the pseudorandom noise word to the sine table values that reduces the output spurs. At any point along the time axis, there is a difference between the output of an actual synthesizer and the output of an ideal sine generator at a frequency $(f_o)$. This difference is termed the output fluctuations which occur with a coherent periodic pattern, the period being some multiple of $(1/f_o)$. If this coherence of the output fluctuation is destroyed, the spurious sidebands will not be produced. Incoherent broad band noise which interfers less with the carrier will result.

It has been determined that one way to reduce the coherence of the output fluctuations is to introduce the random process which will make the mean value of the output fluctuations equal to zero. If the mean value of the fluctuations is equal to zero, the mean value of the fourier transform of the fluctuations will be zero and thus the spurious sidebands should disappear. This theory is not completely true because the coherence of the power spectrum and not the amplitude spectrum must be destroyed to eliminate the spurious sidebands. However, the argument is valid to the first order in the probability distribution of the random process.

The purpose of adding the random or pseudorandom noise word to the sine table value in the randomized direct digital synthesizer 10 is to make the mean value of the output fluctuations equal to zero. Suppose that the sine table provides an output with a value of $v = V + dv$ where (V) is the output value truncated to M-bits and (dv) is the remainder. Without the addition of the random word, the trimmed M-bit digital-to-analog converter 20 will provide an output voltage proportional to (V).

Thus, the output fluctuation at that instant will be proportional to (dv); that is, to the M-bit resolution of the sine table if the random word (x) is added to (v) before truncating (v) to M-bits. Also, suppose that (x) can change from (0 to $2^{N-M}-1$) with uniform probability. There are $(2^{N-M})$ values such that each value has a probability of $(2^{M-N})$. If (x) is less than the quantity $(2^{N-M}-dv)$, then the quantity $(v+x)$ will be truncated to (V) as before. However, if (x) is equal to or greater than the quantity $(2^{N-M}-dv)$, $(v+x)$ will be truncated to $(V+2^{N-M})$.

Since there are $(2^{N-M}-dv)$ values of (x) less than $(2^{N-M}-dv)$ and the (dv) values of (x) are equal to or greater than $(2^{N-M}-dv)$, then the mean value of the truncated output Tr is:

$$<Tr> = 2^{M-N}[V(2^{N-M}-dv)+(V+2^{N-M})dv]=V+dv=v. \qquad (17)$$

Thus, for this probability distribution, the average value of the truncated output is just the untruncated value, and the mean value of the output fluctuations will be zero to an accuracy given by the sum of the accuracy to which the digital-to-analog converter 20 is trimmed and the accuracy of the sine table 12.

The RMS phase fluctuations of a sine output synthesizer is equal to the RMS value of the output fluctuations divided by the output amplitude. For a standard sine output synthesizer with an M-bit digital-to-analog converter and a sine table with negligible error, the RMS output fluctuations are approximately one-half of the least significant bit of the digital-to-analog converter. Thus the RMS fluctuations of such a synthesizer are given by $(2^{-M})$ assuming that the output voltage swing is the full scale of the converter. The square of this RMS value is the spectral sum of all the output spurious sidebands of the sine output synthesizer. An ideal sine output synthesizer does not produce random phase noise but only spurious sidebands.

For the randomized digital-to-analog converter direct digital synthesizer, the RMS output fluctuations are still approximately one-half of the least significant bit of the converter 20 so that the total phase noise $(2^{-M})$ remains the same as before. In this case, most of the spurious sideband power is replaced by a broad band spectrum which has a spectral density at low frequencies of approximately $(2^{-M}/fc)$.

The sine output randomized digital-to-analog converter direct digital synthesizer 10 has been reduced to practice on a TTL breadboard utilizing a 12-bit converter, the resolution of which was effectively reduced by disconnecting the lower bits. To eliminate an overflow problem caused by the use of an existing sine table ROM when the full output swing of the converter was used, the output swing of the converter was reduced by a factor of two. This reduced the effective accuracy of the converter to eleven bits.

Figure 7A:
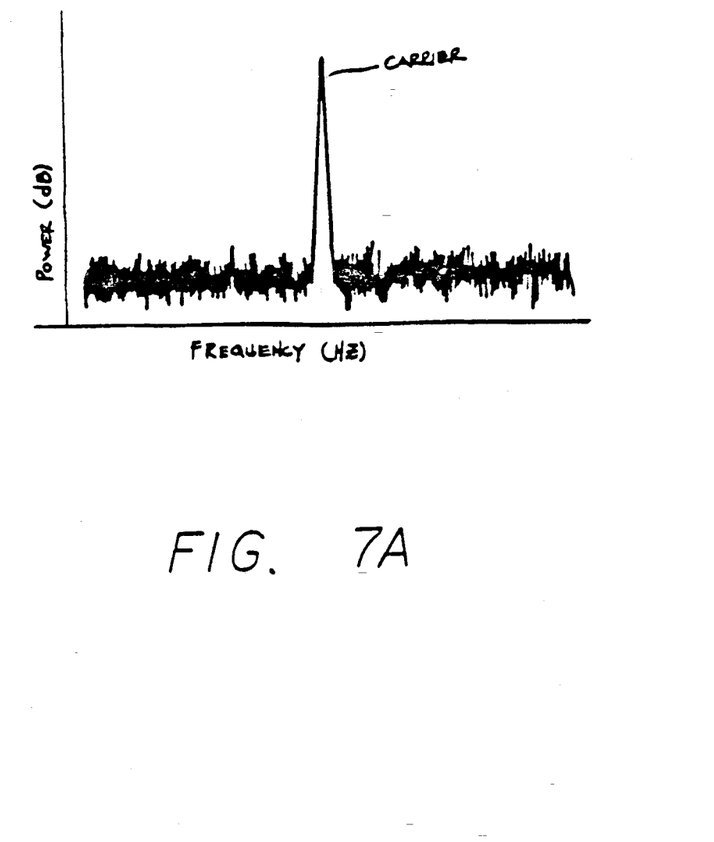
FIG. 7A illustrates a graphical representation of the output frequency spectrum of the sine output randomized direct digital synthesizer of FIG. 6.
Figure 7B:
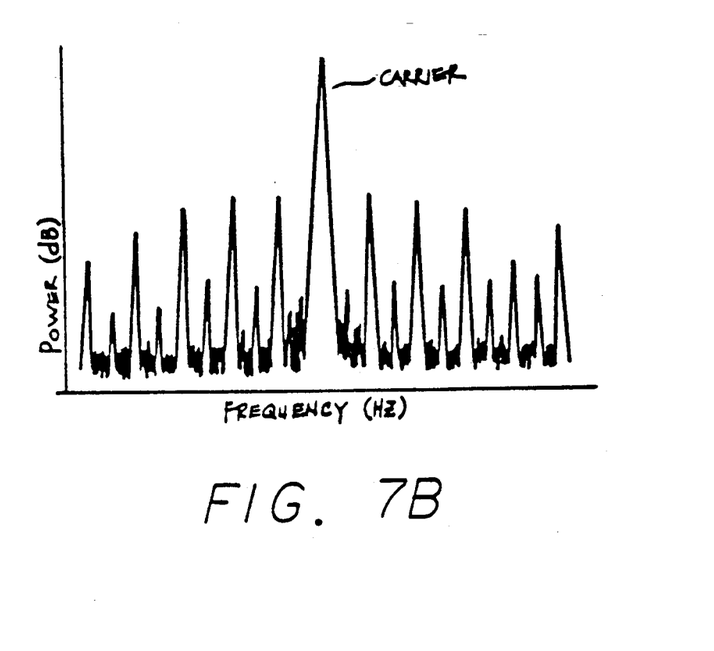
FIG. 7B illustrates a graphical representation of the output frequency spectrum of a direct digital synthesizer of the prior art.

Typical test data for 5-bit resolution with and without the added random word is illustrated in FIGS. 7A and 7B. Note that the carrier frequency is immediately obvious in FIG. 7A which employs the randomizing direct digital synthesizing method of the present invention. When the randomizing technique of the present invention is not employed, the spurious sidebands are distributed throughout the spectrum of the carrier frequency interferring with the identification of the carrier. In contrast, the spurious sidebands that appear in FIG. 7B has been eliminated by the randomization of the direct digital synthesizer of the present invention while retaining the total phase noise at the previous level.

Figure 8:
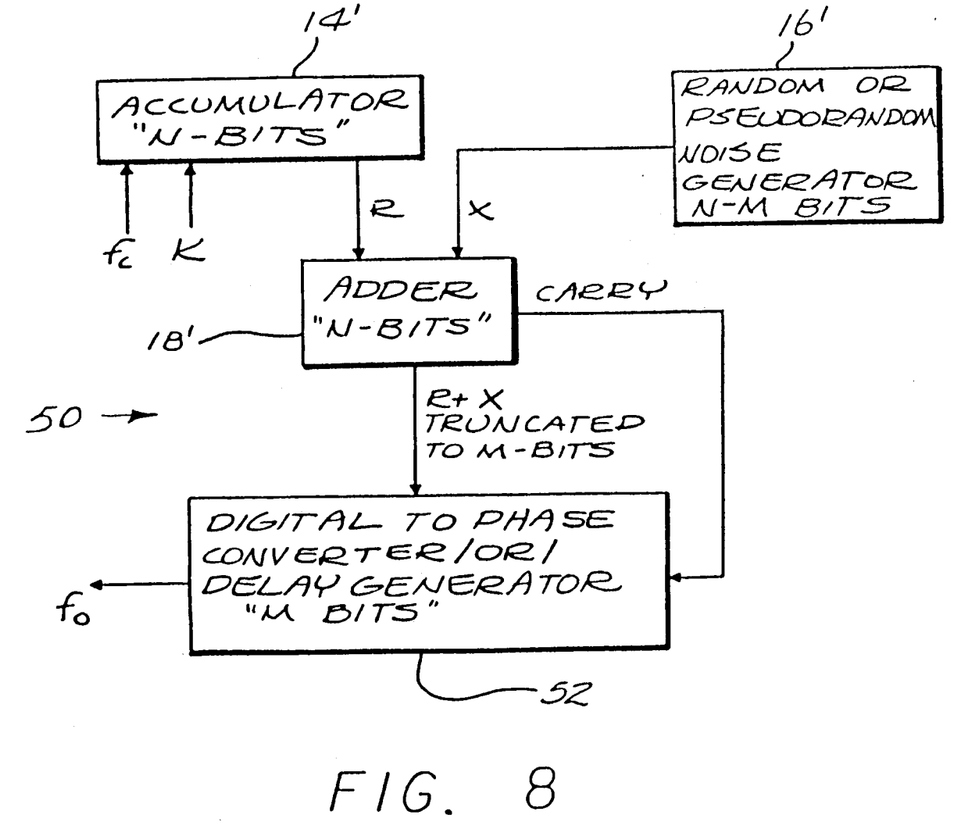
FIG. 8 illustrates a block diagram of a phase interpolation randomized digital-to-analog converter direct digital synthesizer in accordance with the present invention.

An alternative embodiment of the randomized digital-to-analog converter direct digital synthesizer is a phase interpolation direct digital synthesizer identified by the general reference character 50 and illustrated in FIG. 8. In this instance, the alternative embodiment 50 of FIG. 8 is of the randomized type somewhat similar to the sine output synthesizer of FIGS. 6 through 7. Parts of the randomized direct digital synthesizer of FIG. 8 which find substantial correspondence in structure and function to those of FIGS. 6-7 are designated with corresponding but primed reference numerals.

The phase interpolation randomized synthesizer 50 includes an accumulator 14' having an input for a frequency clock ($f_c$) and an input for the frequency word (K). The accumulator provides the current register value (R) to an adder 18'. A random or pseudorandom noise generator 16' provides a random digital word (x) which is also delivered to the adder 18'. The adder 18' is an N-bit device that sums the register value (R) to the random digital word (x) and then truncates the sum to M-bits. The truncated sum is delivered to a digital-to-phase converter or a delay generator 52 which is an M-bit device. The adder further provides a carry output which is also delivered to the converter/generator 52. The output of the converter/generator 52 is the output frequency ($f_o$). Note that the sine output randomized digital-to-analog converter direct digital synthesizer 10 of the preferred embodiment did not include a carry output.

The phase interpolation randomized synthesizer 50 of the alternative embodiment operates basically in the same fashion as the sine output randomized synthesizer 10 of the preferred embodiment. However, the phase interpolation synthesizer 50 adds the random digital word to the value of the accumulator 14'. Again, the random digital word ranges from (0 to $2^{N-M}-1$). For this type of synthesizer to be effective in reducing spurious sidebands to the M-bit level, both the digital-to-analog converter and the digital-to-phase converter must be accurate to M-bits.

The accumulator 14' is usually comprised of a pulse output or fractional divider type of direct digital synthesizer. Features that distinguish the alternative embodiment from the preferred embodiment include the absence of a sine table ROM and a digital-to-analog converter from the phase interpolation synthesizer and the addition of a digital-to-phase converter/delay generator and a carry output line. As in the preferred embodiment, the accumulator 14' generates the register value (R) that is stepped in time by the frequency word (K). Also the digital-to-phase converter/delay generator 52 functions to delay the carry pulse from the adder 18' by an amount of time proportional to the value (R+x), such that $$\Delta t \; \alpha (Rn+x) \qquad (18).$$

When the waveform of the signal on the carry output line from the adder 18' to the converter/generator 52 is compared to the waveform of an ideal synthesizer, a time error $\Delta t$ is apparent. The time error ($\Delta t$) is the phase jitter between the ideal system and the actual system where the change in time ($\Delta t$) is proportional to the register value in the accumulator and to the delay added to the synthesizer 50.

As in the randomization technique of the preferred embodiment, the addition of the small random binary word (x) to the register value (R) reduces the spurious sidebands while the phase noise is reduced by a factor of $(2^{-2M})$ compared to the past randomization techniques.

From the foregoing, it will be appreciated that the randomized digital-to-analog converter direct digital synthesizer of the invention eliminates the spurious sidebands appearing on each side of the synthesized carrier frequency and associated with the finite resolution of the digital-to-analog converter without overly increasing the phase noise level and without inordinately increasing circuit complexity, and that the randomized synthesizers are small in size and weight and minimize power consumption. Further, only one random or pseudorandom noise generator is required to drive several direct digital synthesizers, the technique employs sine output or phase interpolation type synthesizers, and the random digital word exhibits fixed properties.

It will be apparent from the foregoing that, while several particular forms of the invention have been illustrated and described, various modifications can be made without departing from the spirit and scope of the invention. Accordingly, it is not intended that the invention be limited, except by the appended claims.

What is claimed is:

1. A randomized synthesizing apparatus for reducing the spurious sidebands of a synthesized signal comprising, in combination:

accumulating means within said synthesizing apparatus, receiving an incremental input signal, for generating a phase angle and for providing a periodic output register value in synchronism with said phase angle;

mathematical reference means connected to said accumulating means for receiving said periodic output register value and for providing a mathematical reference for said register value;

noise generating means within said synthesizing apparatus for generating a random word;

summing means in communication with said mathematical reference means and said noise generating means for summing said mathematical reference of said register value and said random word to provide a sum output digital signal, said sum output digital signal being truncated; and converting means connected to said summing means for receiving said truncated sum output digital signal and converting said truncated sum for a digital signal to an analog signal, said random word converting said spurious sidebands to broad band phase noise by destroying the coherence of said sidebands and by randomizing the periodic behavior of said truncation process.

2. The randomized synthesizing apparatus of claim 1 wherein said accumulating means comprises in accumulator.

3. The randomized synthesizing apparatus of claim 2 wherein said accumulator comprises a storage register and an adder operatively connected to said storage register for adding said incremental input value to contents stored in said storage register.

4. The randomized synthesizing apparatus of claim 3 wherein said adder is an N-bit adder.

5. The randomized synthesizing apparatus of claim 3 wherein said storage register is an N-bit storage register.

6. The randomized synthesizing apparatus of claim 1 wherein said mathematical reference means is a sine look-up table.

7. The randomized synthesizing apparatus of claim 6 wherein said sine look-up table comprises a read only memory.

8. The randomized synthesizing apparatus of claim 6 wherein said sine look-up table comprises a random access memory.

9. The randomized synthesizing apparatus of claim 1 wherein said noise generating means comprises a random noise generator.

10. The randomized synthesizing apparatus of claim 1 wherein said noise generating means comprises a pseudorandom noise generator.

11. The randomized synthesizing apparatus of claim 1 wherein said summing means comprises an adder.

12. The randomized synthesizing apparatus of claim 11 wherein said mathematical reference of said register value is equal to the sine of said register value.

13. The randomized synthesizing apparatus of claim 12 wherein said converting means has a predetermined bit resolution with a least significant bit, and said random word is a digital number identified by (x) and ranging in value from zero to the least significant bit of said converting means minus one.

14. The randomized synthesizing apparatus of claim 13 wherein said adder provides said sum output digital signal, said output digital signal being the sum of the sine of said register value and (x).

15. The randomized synthesizing apparatus of claim 1 wherein said truncated sum of said summing means is N-bits in length.

16. The randomized synthesizing apparatus of claim 1 wherein said converting means comprises a digital-to-analog converter.

17. The randomized synthesizing apparatus of claim 1 wherein said converting means is M-bits in length.

18. The randomized synthesizing apparatus of claim 1 wherein said analog signal is an electrical voltage.

19. The randomized synthesizing apparatus of claim 1 wherein said means for converting has a bit resolution of M bits, and said broad band phase noise is reduced by a factor of $(2^{-M})$.

20. The randomized synthesizing apparatus of claim 1 wherein said apparatus is small in size, lightweight, and minimizes power consumption.

21. A randomized digital-to-analog converter direct digital synthesizer for reducing the spurious sidebands of a synthesized signal comprising, in combination:
an accumulator included within said synthesizer, receiving an incremental input signal, for generating a phase angle and for providing a periodic output register value in synchronism with said phase angle;
a read only memory connected to said accumulator, receiving said periodic output register value, and for providing a mathematical sine equivalent for said register value;
a noise generator included within said synthesizer for generating a random digital word;
an adder in communication with said read only memory and said noise generator for summing said mathematical sine equivalent of said register value and said random digital word to provide a sum output, said sum being truncated; and
a digital-to-analog converter connected to said added for converting said truncated sum from a digital signal to an analog signal, for providing an output voltage, said random digital word converting spurious sidebands to broad band phase noise by destroying the coherency of said sidebands and by randomizing the periodic behavior of said truncation process.

22. A method for the randomization of spurious sidebands in a sine output direct digital synthesizer, said method comprising the steps of:
generating a phase angle from a periodic incremental input signal to an accumulator;
providing a periodic output register value from said accumulator, said register value in synchronism with said phase angle;
connecting a read only memory to said accumulator for receiving said periodic output register value and providing a mathematical sine equivalent value;
generating a random digital word for converting said spurious sidebands to broad band phase noise;
summing said mathematical sine equivalent and said random digital word to provide a sum output, and truncating said sum for destroying the coherence of said sidebands; and
converting said truncated sum from a digital signal to an analog signal for providing an output voltage, said spurious sidebands being reduced by randomizing the periodic behavior of said truncation process.

23. A randomized synthesized apparatus for reducing the spurious sidebands of a synthesized signal comprising, in combination:
accumulating means within said synthesizing apparatus, receiving an incremental input signal, for generating a phase angle and for providing a periodic output register value in synchronism with said phase angle;
noise generating means within said synthesizing apparatus for generating a random word;
summing means in communication with said accumulating means and said noise generating means for providing a carry pulse and for summing said periodic output register value and said random word to provide a sum output digital signal, said sum output digital signal being truncated; and
delay means connected to said summing means to receive said truncated sum output digital signal and said carry pulse for delaying said carry pulse by an increment of time proportional to said truncated sum, said delayed carry pulse for converting said spurious sidebands to broad band phase noise by destroying the coherence of said sidebands and by randomizing the periodic behavior of sand truncation process.

24. The randomized synthesizing apparatus of claim 23 wherein said accumulating means comprises an accumulator.

25. The randomized synthesizing apparatus of claim 24 wherein said accumulator comprises a storage register and an adder operatively connected to said storage register for adding said incremental input value to contents stored in said storage register.

26. The randomized synthesizing apparatus of claim 25 wherein said adder is an N-bit adder.

27. The randomized synthesizing apparatus of claim 25, wherein said storage register is an N-bit storage register.

28. The randomized synthesizing apparatus of claim 23 wherein said noise generating means comprises a random noise generator.

29. The randomized synthesizing apparatus of claim 23 wherein said noise generating means comprises a pseudorandom noise generator.

30. The randomized synthesizing apparatus of claim 23 wherein said summing means comprises an adder.

31. The randomized synthesizing apparatus of claim 30 wherein said delay means has a predetermined bit resolution with a least significant bit, said random word is a digital number identified by (x) and ranging in value from zero to the least significant bit of said delay means minus one.

32. The randomized synthesizing apparatus of claim 31 wherein said adder provides said sum output digital signal, said output signal being the sum of said register value and (x).

33. The randomized synthesizing apparatus of claim 23 wherein said apparatus is small in size, lightweight, and minimizes power consumption.

34. The randomized synthesizing apparatus of claim 23 wherein said delay means has a bit resolution of M bits, and said truncated sum of said summing means is M-bits in length.

35. The randomized synthesizing apparatus of claim 23 wherein said delay means comprises a delay generator.

36. The randomized synthesizing apparatus of claim 23 wherein said delay means comprises a digitalto-phase converter.

37. The randomized synthesizing apparatus of claim 23 wherein said delay means is M-bits in length.

38. The randomized synthesizing apparatus of claim 23 wherein said delay means provides an output frequency signal.

39. The randomized synthesizing apparatus of claim 23 wherein said delay means has a bit resolution of M bits, and said broad band phase noise is reduced by a factor of $(2^{-M})$.

40. A method for the randomization of spurious sidebands in a phase interpolation direct digital synthesizer, said method comprising the steps of:
generating a phase angle from a periodic incremental input signal to an accumulator;
providing a periodic output register value from said accumulator, said register value in synchronism with said phase angle;
generating a random digital word for converting said spurious sidebands to broad band phase noise;
summing said periodic output register value with said random digital word to provide a sum output and a carry pulse, said sum being truncated for destroying the coherence of said sidebands;
receiving said truncated sum and said carry pulse in a delay generator operative to produce a delay of said carry pulse responsive to said truncated sum by an increment of time proportional to said truncated sum; and
generating a synthesized signal from said delayed carry pulse, whereby said spurious sidebands are randomized by randomizing the delay of said carry pulse.

41. A randomized digital-to-analog converter direct digital synthesizer for reducing the spurious sidebands of a synthesized signal comprising, in combination:
an accumulator included within said synthesizer, receiving an incremental input signal, for generating a phase angle and for providing a periodic output register value in synchronism with said phase angle;
a noise generator included within said synthesizer for generating a random digital word;
an adder in communication with said accumulator and said noise generator for providing a carry pulse and for summing said periodic output register value and said random digital word to provide a sum output, said sum being truncated; and
a delay generator connected to said adder, for receiving said truncated sum and said carry pulse, for delaying said carry pulse by an increment of time proportional to said truncated sum, said delayed carry pulse for converting said spurious sidebands to broad band phase noise by destroying the coherence of said sidebands and by randomizing the periodic behavior of said truncation process.

42. A randomized digital-to-analog converter direct digital synthesizer for reducing the spurious sidebands of a synthesized signal comprising, in combination:
an accumulator included within said synthesizer, receiving an incremental input signal, for generating a phase angle and for providing a periodic output register value in synchronism with said phase angle;
a noise generator included within said synthesizer for generating a random digital word;
an adder in communication with said accumulator and said noise generator for providing a carry pulse and for summing said periodic output register value and said random digital word to provide a sum output, said sum being truncated; and
a digital-to-phase converter connected to said adder, for receiving said truncated sum and said carry pulse, for delaying said carry pulse by an increment of time proportional to said truncated sum, said delayed carry pulse for converting said spurious sidebands to broad band phase noise by destroying the coherence of said sidebands and by randomizing the periodic behavior of said truncation process.

* * * * *